May 25, 1948.    W. R. PRICE    2,442,312
SPIRAL WOUND GASKET
Filed July 11, 1946    4 Sheets-Sheet 1

INVENTOR
Wm. R. Price
BY
ATTORNEY

May 25, 1948. W. R. PRICE 2,442,312
SPIRAL WOUND GASKET
Filed July 11, 1946 4 Sheets-Sheet 2

INVENTOR
Wm. R. Price
BY
ATTORNEY

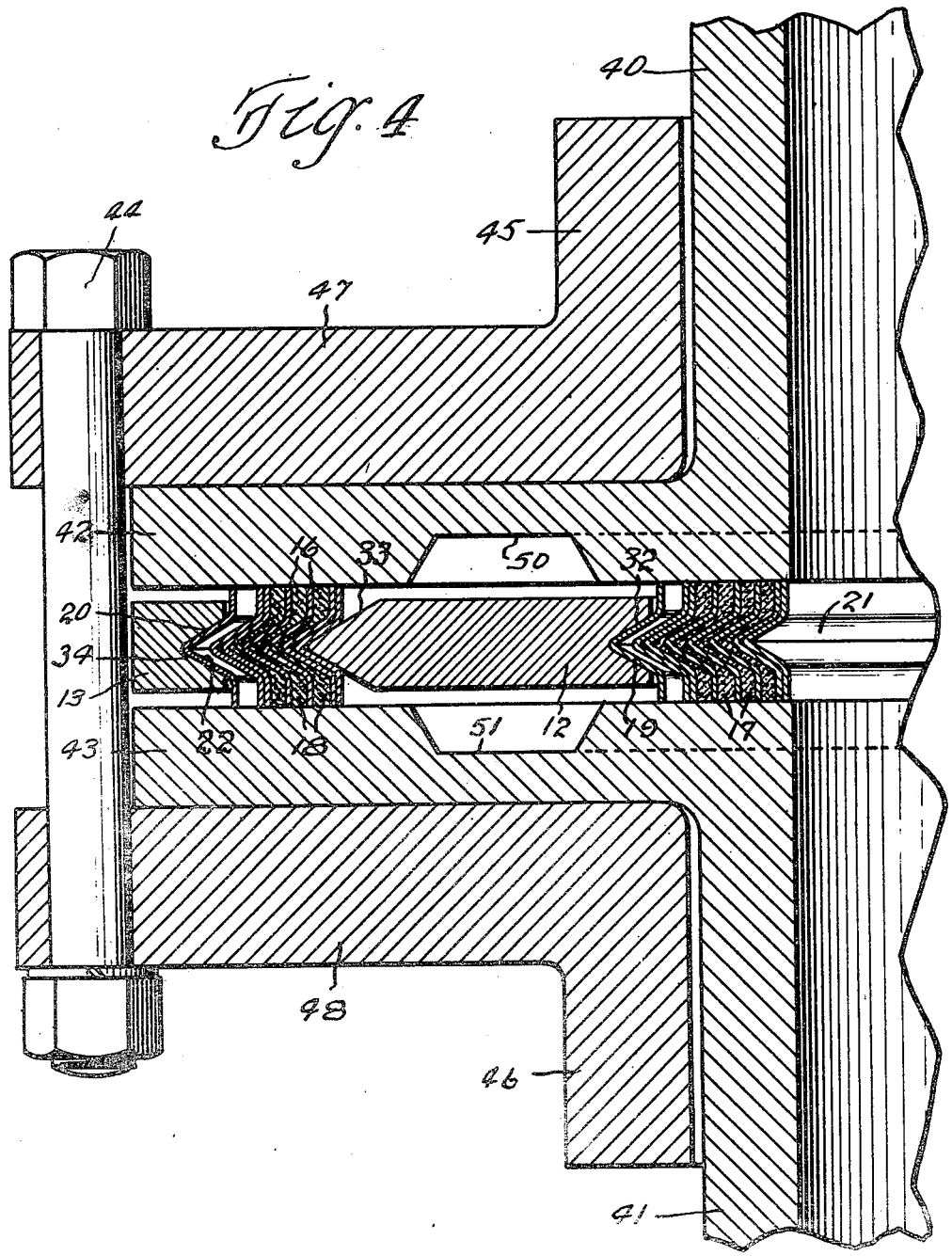

May 25, 1948. W. R. PRICE 2,442,312
SPIRAL WOUND GASKET
Filed July 11, 1946 4 Sheets—Sheet 4
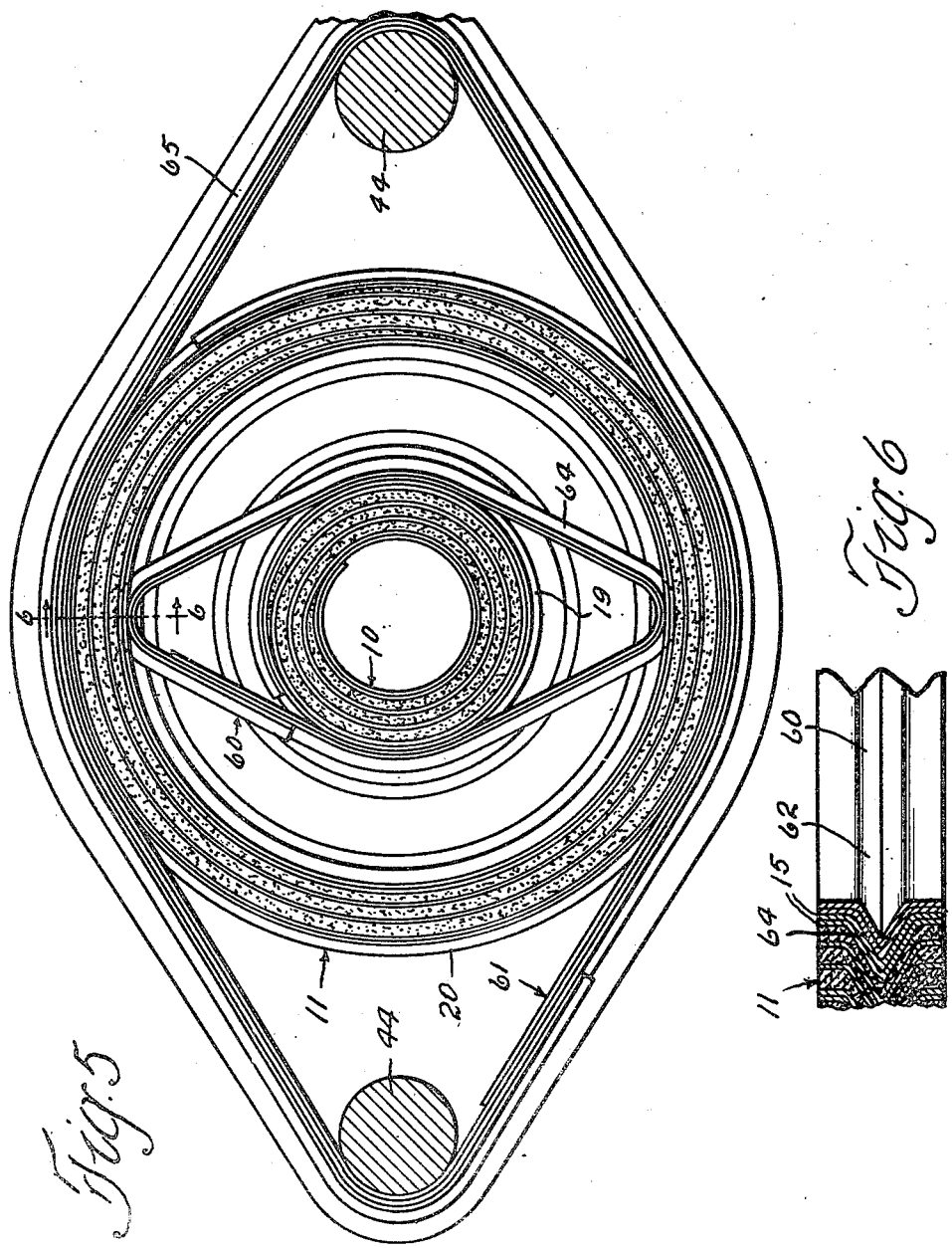
INVENTOR
Wm. R. Price
BY
ATTORNEY Patented May 25, 1948

2,442,312

UNITED STATES PATENT OFFICE 2,442,312

SPIRAL WOUND GASKET

William R. Price, Rosemont, Pa., assignor to Flexitallic Gasket Company, Camden, N. J., a corporation of New Jersey Application July 11, 1946, Serial No. 682,890

6 Claims. (Cl. 288—27)

This invention relates to spiral wound gaskets and more particularly to composite spiral wound gaskets for sealing ring type joints.

In ring type joints the adjacent faces of the flanges to be sealed are provided with aligned grooves to receive a packing ring. It is an object of this invention to provide a gasket of the spiral wound type which may be used in joints of the above type to replace the packing ring.

Another object is to provide a spiral wound gasket which is automatically centered and positioned to seal the adjacent flanges.

Another object is to provide a spiral wound gasket for the above purpose which may be shipped and used as a unit.

Another object is to provide a novel and improved gasket for sealing high pressure ring type joints.

Various other objects and advantages will be apparent as the nature of the invention is more fully disclosed.

Although the novel features which are characteristic of this invention are pointed out more particularly in the claims the nature of the invention will be better understood by referring to the following descripton, taken in connection with the accompanying drawings in which certain specific embodiments are set forth for purposes of illustration.

In the drawings:

Fig. 4 is a partial vertical section through a pair of adjacent flanges showing the gasket in place;

Fig. 5 is a plan view of a gasket illustrating another embodiment of the invention; and Fig. 6 is a partial section taken on the line 6—6 of Fig. 5.

Figure 1:
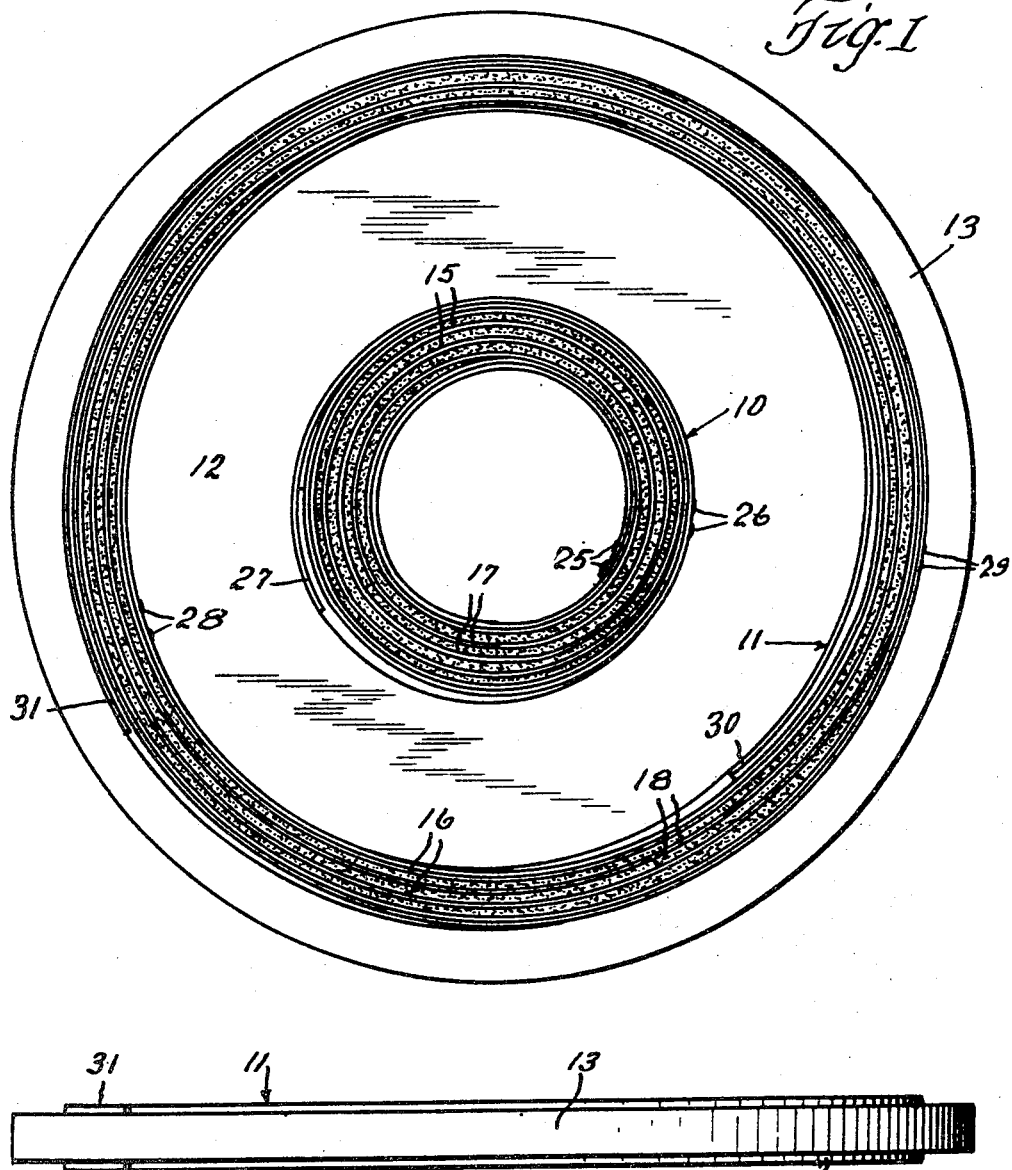
Fig. 1 is a plan view of a gasket embodying the present invention.
Figure 2:
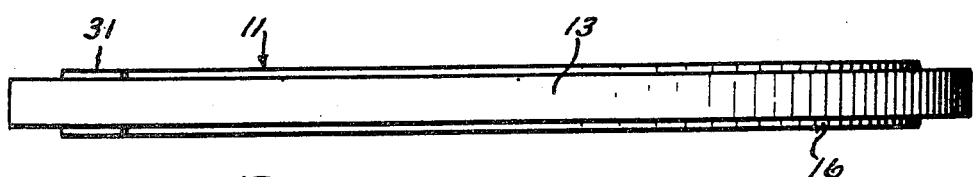
Fig. 2 is a side elevation thereof.
Figure 3:
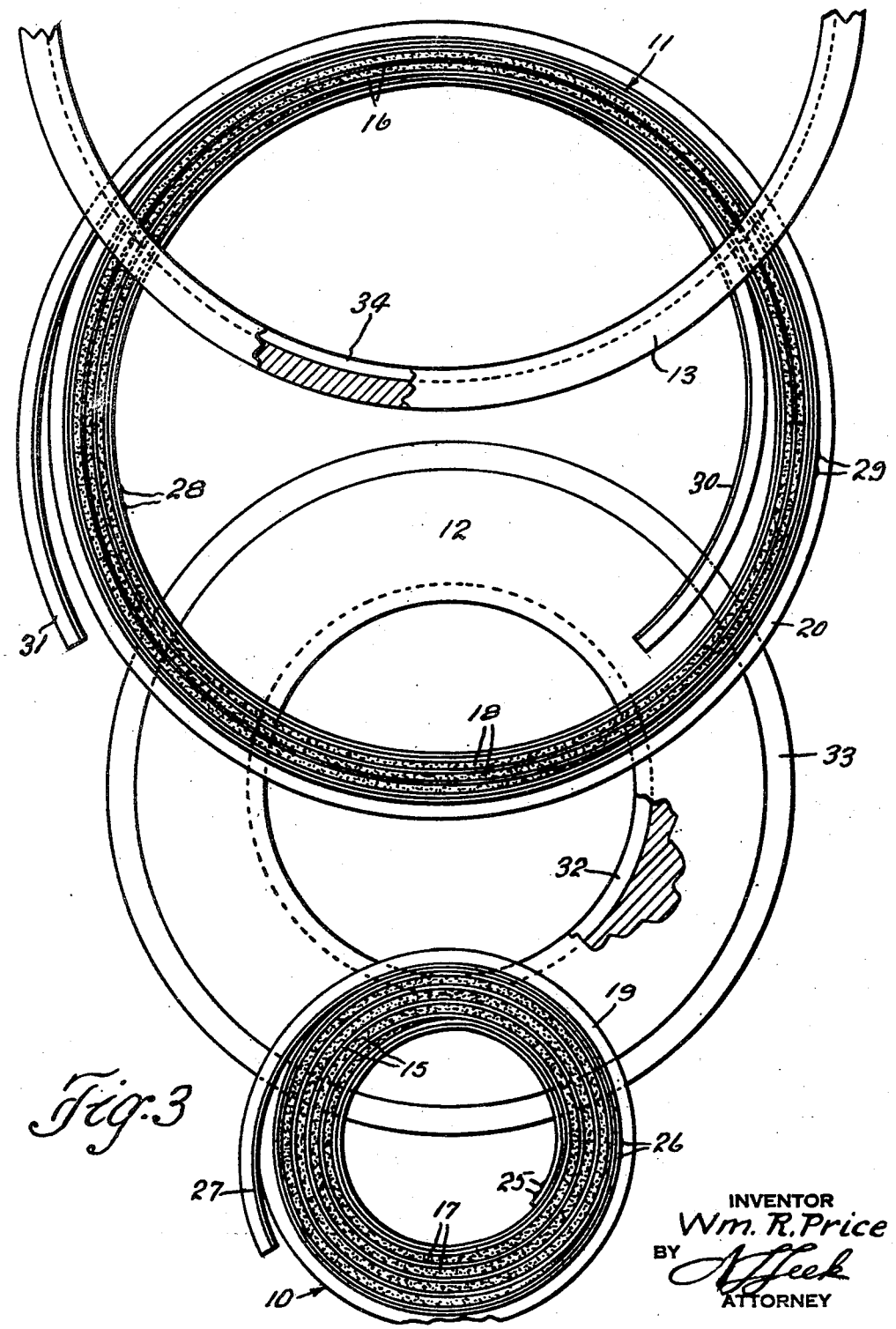
Fig. 3 is an exploded detail view showing the elements of the gasket before assembly.

Referring to the drawings more in detail, Figs. 1 to 4 show a composite spiral wound gasket composed of spiral wound sealing elements 10 and 11, a solid spacing ring 12 between the sealing elements 10 and 11 and an outer centering and gage ring 13. The spiral wound elements 10 and 11 are of the type disclosed in Bohmer et al. Patent No. 2,200,212, dated May 7, 1940, and comprise metal strips 15 and 16 respectively, spiral wound with strips 17 and 18 respectively of a compressible filler material such as asbestos, asbestos composition, a plastic composition or a soft metal. In the form shown the strips 15 and 16 are grooved longitudinally to form opposed beads 19 and 20 and grooves 21 and 22 respectively (Fig. 4).

The element 10 is shown as formed with a pair of metal-to-metal convolutions on its inner periphery and on its outer periphery. The inner end is secured by welds 25 near the free end of the strip 15. The outer convolutions are secured by welds 26 which are remote from the free end of the metal strip to leave a spring extension 27 for the purpose to be described.

The element 11 is likewise wound with a pair of metal-to-metal convolutions at its inner and outer peripheries which are secured by welds 28 and 29 respectively. The welds 28 and 29 are located at a point remote from the free ends of the strip 16 to leave spring extensions 30 and 31 respectively.

The spacing ring 12 is thinner in section than the elements 10 and 11 and is formed on its inner periphery with a groove 32 to receive the bead 19 of the element 10, and on its outer periphery with a bead 33 to enter the groove 22 of the element 11.

The centering ring 13 is formed on its inner periphery with a groove 34 to receive the bead 20 of the element 11 and its outer periphery is adapted to seat within the belt circle of the joint for centering the gasket. The centering ring 13 is thinner in section than the elements 10 and 11 and may be accurately sized to serve as a gage for determining the proper setting of the pipe flanges. The rings 12 and 13 are shown as of solid metal although they may be spiral wound from a beaded metal strip with or without a filler, being similar to the spacing ring of the Bohmer et al. Patent No. 2,027,299, dated January 7, 1936. The rings 12 and 13 are shown as of the same thickness. The thickness may be varied, but the ring 12 should at any event be no thicker than the ring 13 and may be made thinner if desired.

It is to be understood that a plurality of metal-to-metal convolutions may be provided at the inner and outer peripheries of the elements 10 and 11 as required depending upon the size of the gasket and the pressures for which it is designed.

The gasket is assembled by snapping the spring extension 27 of the element 10 into the groove 32 of the ring 12, snapping the spring extension 30 of the element 11 over the bead 32 of the ring 12 and snapping the spring extension 31 into the groove 34 of the ring 13 as shown in Fig. 1. In this way the interlocking beads and grooves secure the elements and the spring extensions provide the necessary resilience to permit some independent movement of the elements and provide clearance for radial expansion of the elements due to their lateral compression in use.

While it is usually convenient to form the spring extensions integral with the spiral wound metal strips it is evident that the extensions may be formed by separate members welded to the metal strip of the gasket if desired.

Fig. 4 illustrates the position of the gasket in a ring type joint between pipes 40 and 41 having flanges 42 and 43. Clamping rings 45 and 46 are secured around the pipes 40 and 41 with flanges 47 and 48 extending over the flanges 42 and 43. The pipe flanges 42 and 43 are provided with aligned grooves 50 and 51 to receive a standard ring type gasket. Bolts 44 extend through flanges 47 and 48 to apply sealing pressure to the pipe flanges and gasket.

The elements 10 and 11 of the present gasket are positioned on the flanges 42 and 43 on opposite sides of the grooves 50 aid 51 with the spacing ring 12 spanning the grooves 50 and 51. The centering ring 13 centers the gasket within the circle of the bolts 44. With the gasket in place as above described the bolts 44 are tightened until the gasket has been compressed to the stated thickness. If the centering ring 13 is accurately made to a known thickness the surfaces of this ring may be used as a gage, the bolts being set up until a predetermined clearance exists between the flanges 42 and 43 and the opposing surfaces of the ring 13. In this way the gasket is known to be held under the pressure required to effect a seal at the pressures employed without overstressing the bolts or deforming the gasket by an excessive pressure.

Gaskets of the above type have been found to effect a dependable seal for high pressure steam lines or the like where the slightest failure becomes serious. The seal is more dependable and may be set for higher pressures than the standard ring gasket for which the grooves 50 and 51 are designed.

Of course, the composite gasket may be used in other types of seal such as for a double opening having a pair of spaced flanges which may or may not be concentric. The separating ring 12 may be perforated if necessary for lightness or for communication between the outer grooves or channels.

An embodiment utilizing a different type of spacing and centering means is shown in Figs. 5 and 6. In this embodiment the sealing elements are of the type shown in Bohmer et al. Patent No. 2,027,299, dated January 7, 1936.

The gasket of Fig. 5 includes spiral wound sealing elements 10 and 11 which are similar to the correspondingly numbered elements of Figs. 1 to 4 and have been given corresponding reference numbers. In this form the spacing ring 12 and centering ring 13 are replaced by centering elements 60 and 61 which comprise one or more convolutions of the gasket metal welded to form a unit. The centering element is formed with a groove 62 and a bead 64 similar to the grooves and beads on the sealing elements themselves. The centering element 61 is formed with a similar groove and with a similar bead 65. The spacing elements 60 and 61 are oval in shape to receive the circular sealing elements and to extend beyond the same at diametrically opposite points to form positioning loops.

The sealing element 10 is secured within the positioning element 60 with the outer bead 19 of the element 10 seated in the groove 62 of the element 60 and the bead 64 of the element 60 seated in the inner groove 22 of the outer sealing element 11. The centering element 60 is of a size to receive the smaller spiral wound element 10 and to snap into the inner groove of the larger spiral wound element 11.

The centering element 61 receives the sealing element 11 with its outer peripheral bead 20 seated in the inner groove 63 of the element 61. The centering element 61 is of a size to extend around a pair of bolts 44 for positioning the assembly.

The elements 10, 11, 60 and 61 may be welded together or may be secured by the resilience of the elements.

This embodiment may be made considerably lighter than the first embodiment and is particularly adapted to the larger gasket sizes. Since the centering elements 60 and 61 are wound from the same metal strip as the sealing elements 10 and 11 the cost is reduced to a minimum. The centering elements 60 and 61 may comprise a single convolution or a plurality of convolutions as desired depending upon the size and the required stiffness.

The two sealing elements 10 and 11 may be eccentric if desired in which case the positioning element 60 will be non symmetrical and will be designed to hold the sealing element 10 in its desired position within the outer sealing element 11. Such a gasket may be used for pumps having eccentric posts, water jackets or the like.

Although certain specific embodiments have been shown and described for purposes of illustration it is to be understood that the invention is capable of various uses and that changes and adaptations may be made therein as will be readily apparent to a person skilled in the art. The invention is only to be restricted in accordance with the scope of the following claims.

What is claimed is:

1. A composite spiral wound gasket for sealing flanges with annular grooves, comprising inner and outer spiral wound sealing elements, each comprising a spiral wound metal strip having a filler of compressible material between at least some of the metal convolutions, said metal strip having a longitudinal central bead forming an internal groove and an external bead at the inner and outer peripheries of each of said elements respectively, the metal strip of said inner element being extended at its outer end to form a spring extension, the metal strip of said outer element being extended at its inner end to form spring extensions, a spacing ring between said inner and outer elements to span said flange grooves having a groove formed in its inner periphery and a bead on its outer periphery, the respective beads and grooves of the spring extensions of the inner and outer elements being seated in said last groove and on said last bead to secure the parts resiliently in place.

2. A composite spiral wound gasket for sealing flanges with annular grooves, comprising inner and outer spiral wound sealing elements, each comprising a spiral wound metal strip having a filler of compressible material between at least some of the metal convolutions, said metal strip having a longitudinal central bead forming an internal groove and an external bead at the inner and outer peripheries of each of said elements respectively, the metal strip of said inner element being extended at its outer end to form a spring extension, the metal strip of said outer element being extended at its inner and outer ends to form spring extensions, a spacing ring between said inner and outer members to span said flange grooves having a groove formed in its inner periphery and a bead on its outer periphery, and a centering ring around the outer element having a groove formed in its inner periphery, the beads and grooves of said spring extensions cooperating with the beads and grooves of said rings to hold the parts resiliently in place.

3. A composite spiral wound gasket comprising inner and outer spiral wound sealing elements, each comprising a spiral wound metal strip having a filler of compressible material between at least some of the metal convolutions, a spacing element between said inner and outer sealing elements comprising an oval convolution of said metal strip, said inner sealing element being secured in the smaller diameter portion of said oval spacing element with the larger diameter portion extending beyond the periphery of said inner sealing element to form positioning loops, said loops being secured to the inner periphery of said outer sealing element.

4. A composite spiral wound gasket comprising inner and outer spiral wound sealing elements, each comprising a spiral wound metal strip having a filler of compressible material between at least some of the metal convolutions, a spacing element between said inner and outer sealing elements comprising an oval convolution of said metal strip, said inner sealing element being secured in the smaller diameter portion of said oval spacing element with the larger diameter portion extending beyond the periphery of said inner sealing element to form positioning loops, said loops being secured to the inner periphery of said outer sealing element and an oval convolution of said metal strip disposed around said outer sealing element to form positioning loops for said gasket.

5. A composite spiral wound gasket comprising inner and outer spiral wound sealing elements, each comprising a spiral wound metal strip having a filler of compressible material between at least some of the metal convolutions, said metal strip having a longitudinal central bead forming an internal groove and an external bead at the inner and outer peripheries of said elements respectively, a spacing element between said inner and outer sealing elements comprising an oval convolution of said metal strip formed with an internal groove and external bead, said inner sealing element being secured in the smaller diameter portion of said oval with its external bead seated in the internal groove of said oval element, the larger diameter portion of said oval element extending beyond the periphery of said inner sealing element to form positioning loops, said loops being secured within said outer sealing element with their external beads seated within the internal groove of said last element.

6. A composite spiral wound gasket comprising inner and outer spiral wound sealing elements, each comprising a spiral wound metal strip having a filler of compressible material between at least some of the metal convolutions, said metal strip having a longitudinal central bead forming an internal groove and an external bead at the inner and outer peripheries of said elements respectively, a spacing element between said inner and outer sealing elements comprising an oval convolution of said metal strip formed with an internal groove and external bead, said inner sealing element being secured in the smaller diameter portion of said oval with its external bead seated in the internal groove of said oval element, the larger diameter portion of said oval element extending beyond the periphery of said inner sealing element to form positioning loops, said loops being secured within said outer sealing element with their external beads seated within the internal groove of said last element and a second positioning element comprising an oval convolution of said metal strip formed with an internal groove secured about the outer periphery of said outer sealing element with the external bead of the latter element seated in the internal groove of said last oval element and with said last oval element extending beyond said outer sealing element to form positioning loops for said gasket.

WILLIAM R. PRICE.

REFERENCES CITED

The following references are of record in the file of this patent:

UNITED STATES PATENTS

| Number | Name | Date |
| --- | --- | --- |
| 761,325 | Schier | May 31, 1904 |
| 2,196,953 | Bohmer et al. | Apr. 9, 1943 |